Dec. 1, 1953   G. F. RACKETT   2,661,290
METHOD OF STRIPPING MULTILAYER NEGATIVES
Filed Sept. 23, 1948
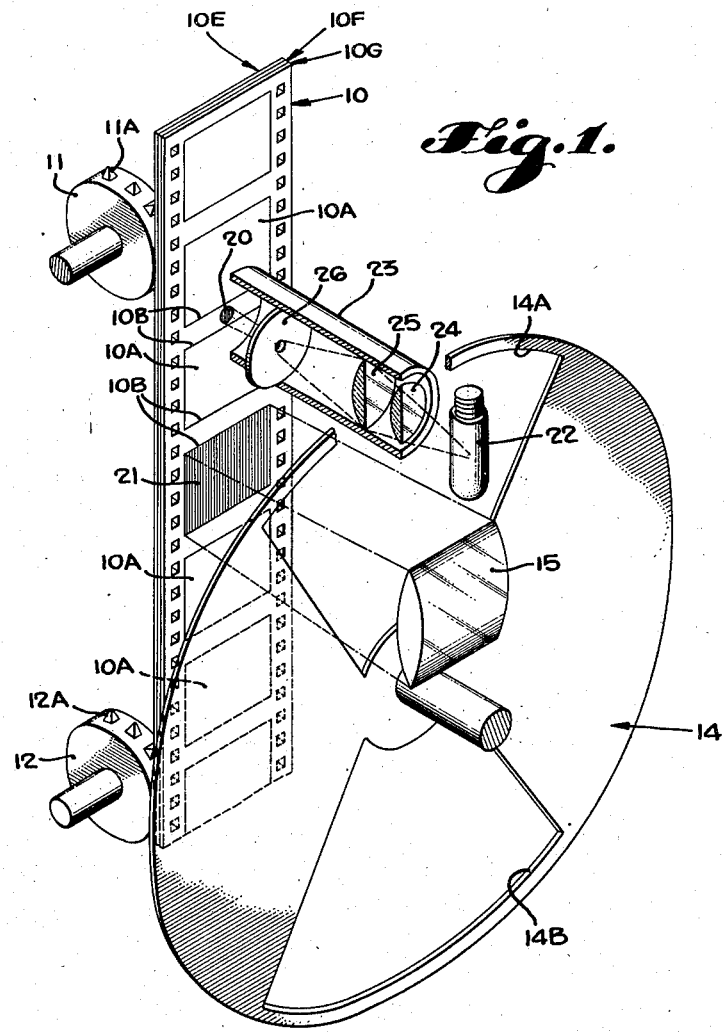
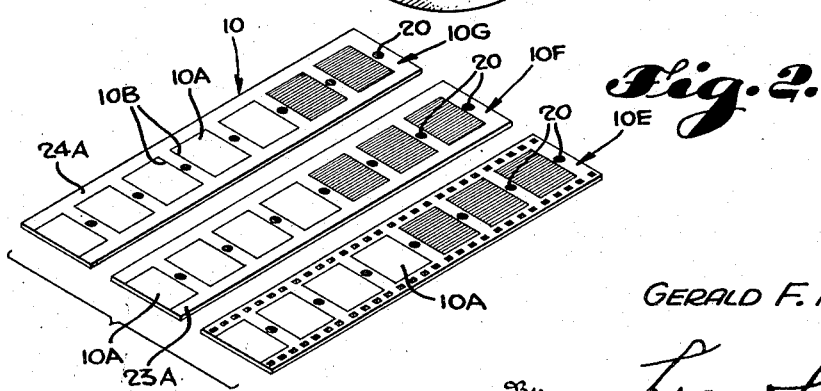
Inventor,
GERALD F. RACKETT.
By Lyon & Lyon
ATTORNEYS Patented Dec. 1, 1953

2,661,290

UNITED STATES PATENT OFFICE 2,661,290

METHOD OF STRIPPING MULTILAYER NEGATIVES

Gerald F. Rackett, Sherman Oaks, Calif., assignor to Columbia Pictures Corporation, Los Angeles, Calif., a corporation of New York Application September 23, 1948, Serial No. 50,693

3 Claims. (Cl. 95—2)

The present invention relates to improved techniques in transferring negative layers of a multilayer, multicolor negative so that the components of an image may be accurately registered in coincidence.

In the so-called chromatone process, a color film on collodion stripping paper is used upon which three component colored images on thin collodion stripping film are projected. Three separation negatives are produced after the individual stripping films are stripped. These three separation negatives may be used in producing prints on print paper or in producing lenticular positives. Present methods of transferring two of the three negative layers of a three-layer three-color negative multiframe movie film having the conventional perforated edges involves the use of pins or other holding devices projecting through the perforations for aligning them whereby the components of an image or each individual stripped film may be registered in juxtaposition or coincidence.

In accordance with the present invention the two layers stripped from their base are transferred to individual unperforated bases which are subsequently perforated in registry after the images thereon are aligned using another new expedient.

In order to accomplish accurate alignment prior to perforation, the superposed film strips are aligned by bringing characteristic markings between frame lines into registry.

An object of the present invention is to provide an improved arrangement whereby a plurality of individually stripped negatives may be accurately aligned in superposed arrangement.

Another object of the present invention is to provide an improved arrangement whereby individually stripped negatives may be assembled in superposed relationship even though individual ones may have undergone different dimensional changes in their processing.

Yet a further object of the present invention is to provide an improved method of assembling stripped negatives of the type described whose individual edge perforations might not otherwise register with edge perforations in the adjacent strip because of different changes in dimensions resulting from the original stripping, processing, etc.

The features of the present invention which are believed to be novel are set forth with particularity in the appended claims. This invention itself, both as to its organization and manner of operation, together with further objects and advantages thereof, may be best understood by reference to the following description taken in connection with the accompanying drawing in which:

Figure 1 is a view showing the manner in which image markings may be made between frame lines of a multilayer, multiframe movie camera film in accordance with one of the aspects of the present invention.

Figure 2 is a view showing the manner in which the individual stripped negatives may be assembled with the image marking produced as indicated in Figure 1 in aligned relation whereby the edges of the two film strips 10F and 10G may be accurately perforated to conform with the perforations in the edges of film strip 10E.

Referring to the drawings, the multi-layer, multicolor film 10 is disposed within a conventional moving picture camera incorporating therein, in conventional manner, film driving and guiding sprocket wheels 11, 12 having corresponding teeth 11A, 12A thereon arranged to enter and engage the perforated portions of the film 10 together with a rotatable shutter 14. The sprocket wheels 11, 12 in shutter 14 are driven in synchronism by means well known in the art so that light images projected through a lens 15 and openings 14A, 14B in the shutter 14 are projected onto successive frames 10A on the film. Successive frames 10A are separated by so-called frame lines 10B forming the edges of such frames 10A.

In accordance with the present invention, while the film 10 is being exposed, a sharply defined image 20 is projected onto the film in the space between adjacent frame lines 10B. This image is shown as a circle but may likewise be a square or other distinguishing figure so that a sharp image of such pattern or patterns is produced. The image is preferably sharp since it serves as a means for aligning the subsequently stripped negatives as described hereinafter.

The image 20 is projected onto the film at the same time that an image 21 is projected, conventionally, onto a picture frame through lens 15. For this reason, the panchromatic light source, comprising an electrical glow lamp 22, is placed on the same side of the shutter as is lens 15 whereby the image 20 is projected intermittently between frame lines. The optical system for obtaining a sharp image 20 may comprise a light tube 23 having mounted therein a pair of spaced lenses 24, 25 and a perforated disk 26 comprising an image caster. The disk 26 may be perforated with different geometrical designs as indicated hereinabove. The film 10 is of color film comprising three strippable layers 10E, 10F and 10G, each one of the layers being sensitive differently to, for example, the three complementary colors, as is well understood in the color movie film art. The light source 22 is panchromatic so that each one of the negative layers 10E, 10F and 10G are exposed with a color producing an image 20 thereon.

After the film 10 is thus exposed, as indicated in Figure 1, the film is processed in a manner well understood in the art to form three individual negative layers 10E, 10F and 10G, each having the original perforated edges.

In accordance with the present invention, two of the layers 10E and 10F are separated from their perforated base and mounted respectively on unperforated bases 23A and 24A, the other layer 10E remaining on its original base. Thereafter, the three layers 10E, 10F and 10G are superposed, in such a manner that the sharp images 20 on each layer are accurately aligned. After the three layers are thus aligned, the bases 23A and 24A have their edges perforated to correspond with the edge perforations in the negative layer 10E. Alternatively, instead of transferring only the layers 10F and 10G to an unperforated base, the third layer 10E may also be transferred to an unperforated base and after the layers 10E, 10F and 10G are aligned by aligning the images 20, all three edges of the bases of such layers may be perforated.

It is understood that the layers 10E, 10F and 10G in Figure 2 may have their images 20 aligned by many different expedients. For example, by light transmitted through the superposed layers, and a conventional perforator die plate may be used in the process of forming the edge perforations.

While the particular embodiments of the present invention have been shown and described, it will be obvious to those skilled in the art that changes and modifications may be made without departing from this invention in its broader aspects.

I claim:

1. In the process of assembling multi-layer film produced from multi-layer multi-frame color film, the steps comprising: moving and exposing individual frames of said film while yet in a multi-layer assemblage, and photographing onto the individual strips of said film a sharply defined two-dimensional image between said individual frames, stripping the multi-layers of film into individual strips, processing each of said strips to develop the images photographed, transferring at least one of said strips onto an unperforated base, superimposing said strips with said two-dimensional image on each strip aligned, and then perforating said base with said two-dimensional images thus aligned.

2. In the process of juxtapositioning film strips of different color, at least one of which is mounted on an unperforated base, and which strips originally have individual frames thereof exposed while yet assembled in multi-layer form, the steps comprising: photographing a two-dimensional alignment image between individual frames, in panchromatic light, onto the individual strips of the film in multi-layer form, at the same time the individual frames thereof are being exposed, stripping the individual color strips from the multi-layer film, processing each of said strips to develop the images photographed thereon, mounting at least two of said strips onto an unperforated base and then perforating said base along its length while said two-dimensional alignment images initially projected onto said strips are aligned.

3. In the process of assembling multi-layer film produced from multi-layer, multiframe color film, the steps comprising: photographing onto said film while yet in a multi-layer assemblage, a sharply defined two-dimensional image between frames of each of the strips of the assemblage, stripping the multi-layer film into individual strips, processing each of said strips to develop said image on each of said strips, transferring one of said strips onto a base, superimposing said strips with said images on each aligned, and then perforating said base with the images thus aligned.

GERALD F. RACKETT.

References Cited in the file of this patent

UNITED STATES PATENTS

| Number | Name | Date |
| --- | --- | --- |
| 1,563,959 | Brewster | Dec. 1, 1925 |
| 1,758,184 | Thornton | May 13, 1930 |
| 1,831,771 | Thornton | Nov. 10, 1931 |
| 1,956,122 | Gaspar | Apr. 24, 1934 |
| 2,269,161 | Morse | Jan. 6, 1942 |
| 2,369,176 | Rackett | Feb. 13, 1945 |
| 2,415,442 | Rackett | Feb. 11, 1947 |
| 2,417,060 | Capstaff | Mar. 11, 1947 |

FOREIGN PATENTS

| Number | Country | Date |
| --- | --- | --- |
| 337,151 | Great Britain | Oct. 30, 1930 |
| 574,138 | Great Britain | Dec. 21, 1945 |
| 574,164 | Great Britain | Dec. 21, 1945 |